March 30, 1954  R. W. BUTLER  2,673,906
TURN SIGNAL SWITCH
Filed July 11, 1951  3 Sheets-Sheet 1
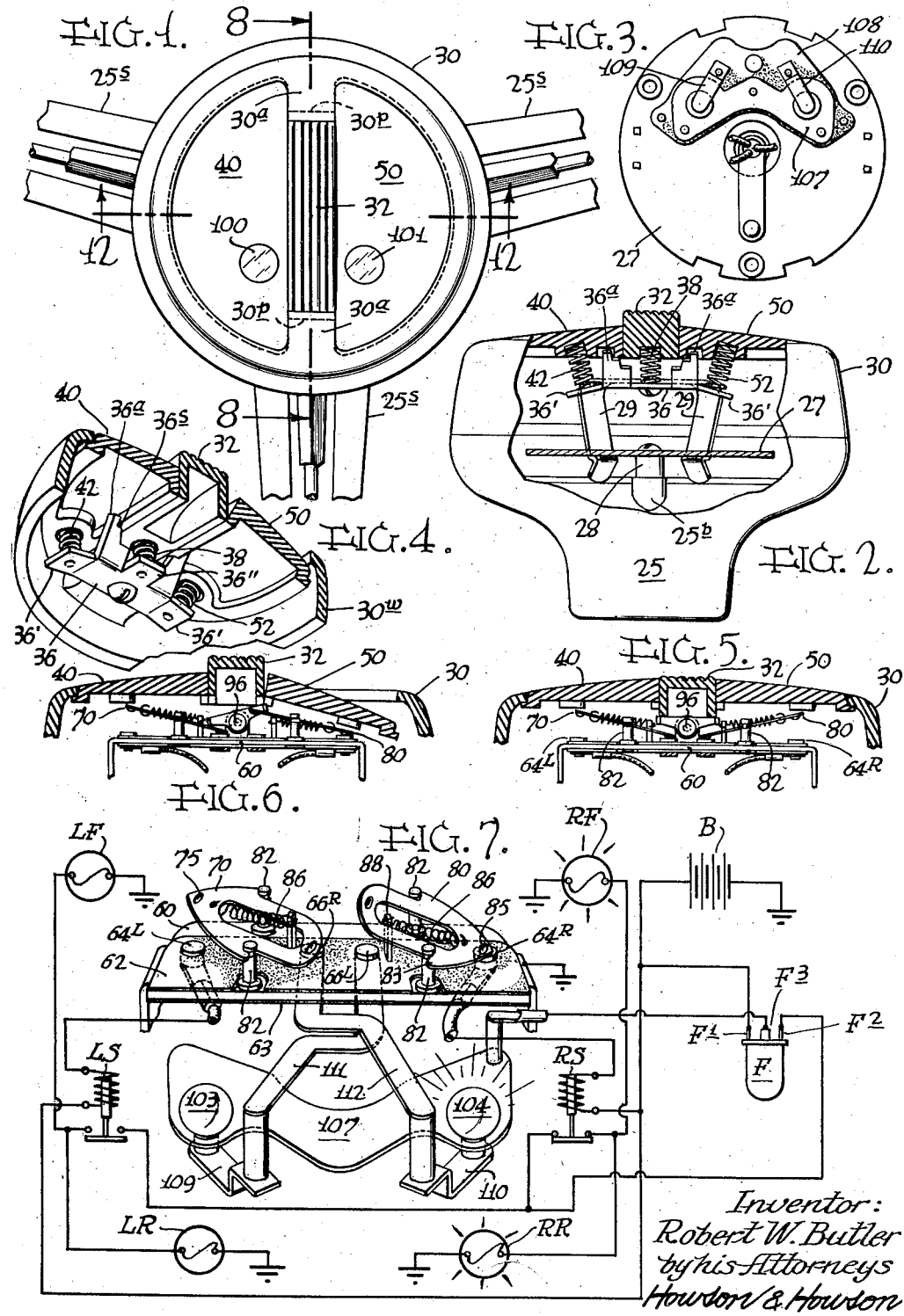
Inventor:
Robert W. Butler
by his Attorneys
Howson & Howson

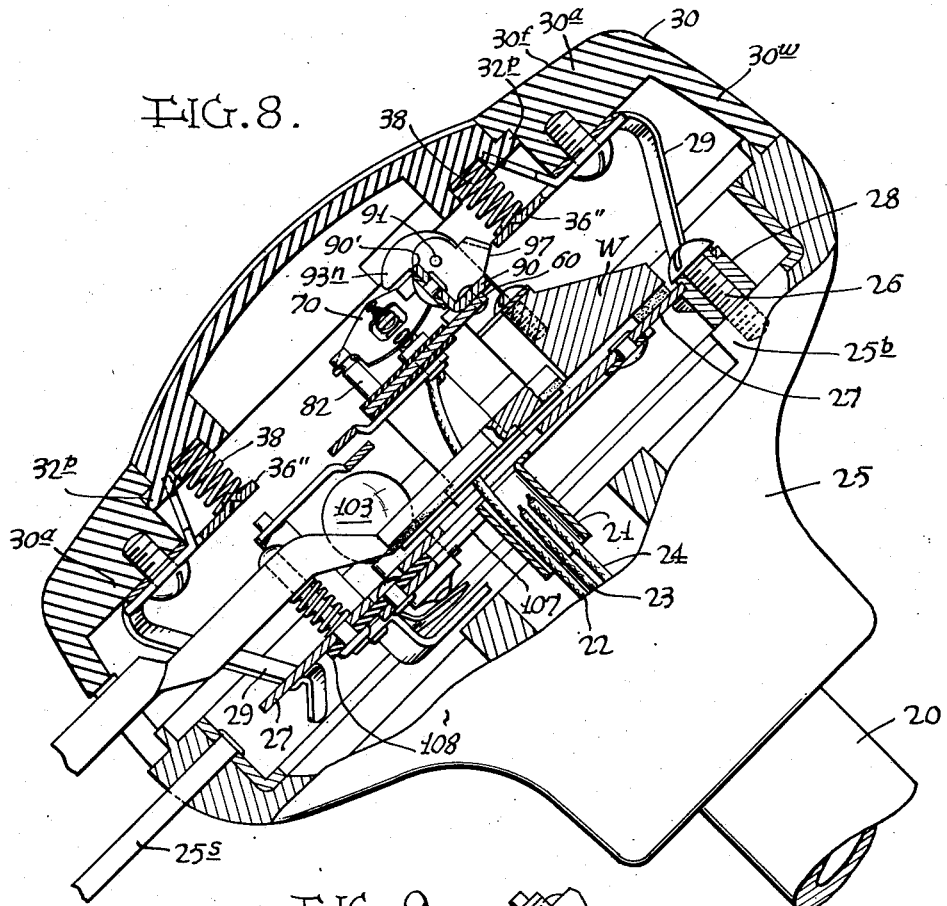
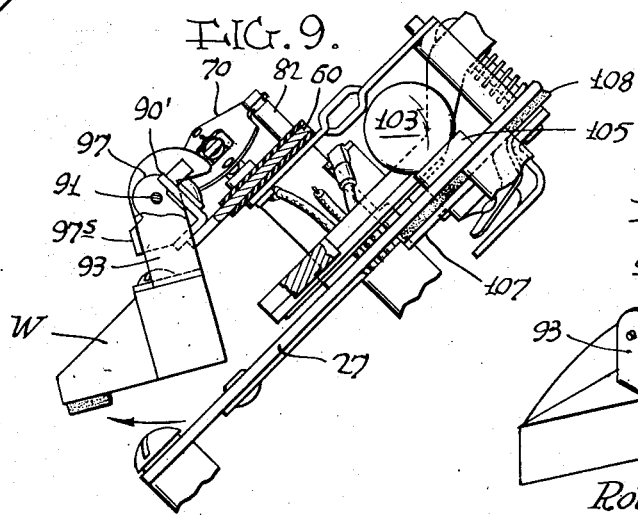
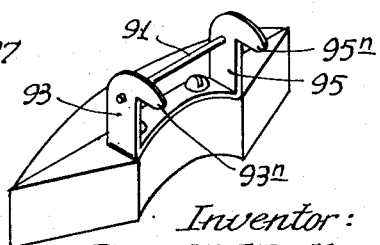

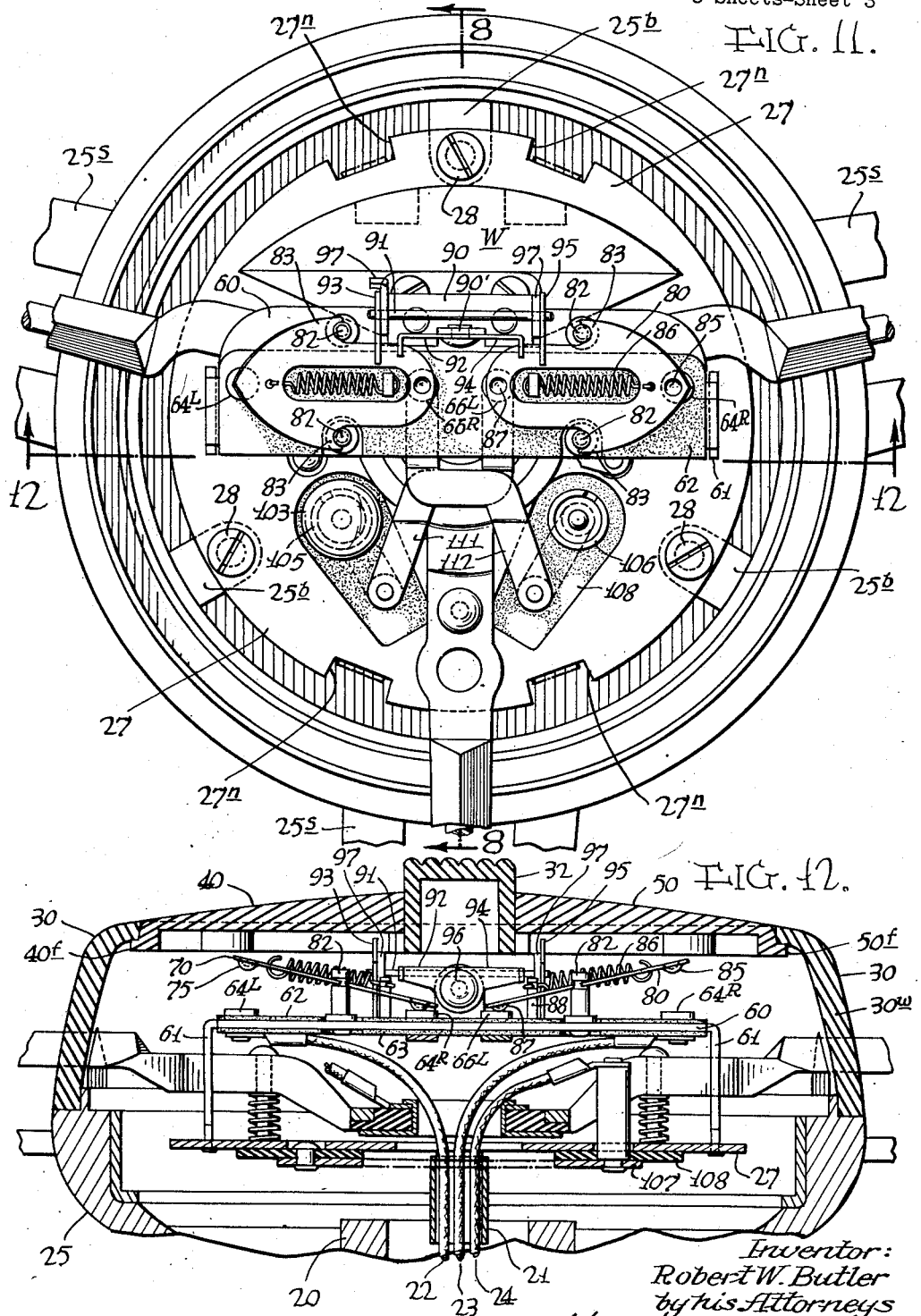

Patented Mar. 30, 1954

2,673,906

UNITED STATES PATENT OFFICE 2,673,906

TURN SIGNAL SWITCH

Robert W. Butler, Moylan, Pa., assignor to United Specialties Company, Philadelphia, Pa., a corporation of Delaware Application July 11, 1951, Serial No. 236,096

14 Claims. (Cl. 200—61.38)

This invention relates to directional signal devices for automobile steering wheels. More particularly it relates to manually operated directional signal apparatus housed entirely within the hub of the steering wheel including means for manual and automatic cancellation.

It is an object of my invention to provide a directional signal control device for automobile steering wheels which may be housed entirely within the hub of a steering wheel at the top of the steering shaft and which requires no extending parts or levers.

Another object of the invention is to provide a device of the foregoing type which may be easily installed and in which the parts are readily available for inspection, adjustment, replacement or repair.

Another object of my invention is to provide a device of the foregoing type wherein the manual control of the giving of a right or left turn signal is by depression of a right or left signal button and wherein an indicated signal may be cancelled manually by depressing a third or cancelling button. A related object is to provide a device of the foregoing type wherein the signal control and cancelling buttons form a part of the housing of the device.

Another object of my invention is to provide in a device of the foregoing type a means for cancelling the signal automatically by turning the steering wheel, through 180° or more, in the course of making a turn.

Another object of the invention is to provide in a device of the foregoing type a cover portion carrying the control buttons and which may be separated or pried away easily from the lower portion of the housing without disturbing any of the wiring connections.

Another object of the invention is to provide a device of the foregoing type which may be assembled on the top of the steering column with a minimum amount of rearrangement of existing parts such as the usual horn button ring and operating mechanism.

Other objects and advantages of the invention will appear as it is described in connection with the accompanying drawings.

In the drawings:

Fig. 1 is a plan view of a hub of a steering wheel of an automobile embodying the invention;

Fig. 2 is a side elevation view partly broken away of the invention illustrated in Fig. 1;

Fig. 3 is a bottom plan view of the mounting plate employed in the invention;

Fig. 4 is a bottom perspective view partly in section of the top or cover portion of the device;

Figs. 5 and 6 are partial section views taken along line 12—12 of Fig. 11 and showing the parts in different positions;

Fig. 7 is a diagrammatic view illustrating the relation of the current carrying parts to the circuit connections of the invention;

Fig. 8 is a transverse section view of the invention taken along line 8—8 of Figs. 1 and 11;

Fig. 9 is a fragmentary view of certain of the parts illustrated in Fig. 8 but showing their positions when the steering wheel has been rotated 180°;

Fig. 10 is a perspective view of the cancelling weight employed in the invention;

Fig. 11 is a plan view partly in section with the cover portion removed;

Fig. 12 is a transverse section taken along line 12—12 of Fig. 11.

Referring to the drawings, the conventional steering shaft 20 is hollow and contains a cable 21 having three insulated conductors 22, 23 and 24 for electrical connections as will hereinafter appear. On the upper end of the shaft 20 is fixedly secured a hollow, funnel-shaped housing member 25 comprising the bottom portion of the hub of the conventional steering wheel not shown. The usual steering wheel spokes 25s extend radially from the upper edge of the housing member 25. Within the housing portion 25 and spaced equally around the periphery near the top edge thereof are bosses 25b which are bored and internally screw-threaded to receive screws or bolts 26.

Within the lower portion of the hub, I provide a mounting plate 27 of disc-shaped stamped sheet metal which is secured to and supported from bosses 25b at equally spaced points around the periphery of the housing 25. Spacing the plate from bosses 25b are collars 28 through which pass securing bolts 26 which thread into the bosses 25b and thus secure the plate and spacing collars on the hub.

On the top peripheral edge of the housing member 25 is mounted a cover comprising a plurality of parts preferably made from insulating material such as any suitable plastic material. The cover comprises a mounting ring 30 having a circular side wall 30w with an inward flange 30f at its upper edge. At diametrically opposite points of the open top of the ring are radial inward extensions 30a. Extending across the opening between these extensions 30a is a depressible hollow rectangular cancelling button 32. In the area of the aperture at the left of the cancelling button is a left signal button 40 and in the area to the right of the cancelling button within the aperture is a right signal button 50 both of these signal buttons being of substantially semi-circular form and depressible. The cancelling button 32 has at each end a projection 32p which is adapted to underlie a shoulder formed by undercutting the inner edge of the extensions 30a of the ring 30. The right and left signal buttons are each provided with a flange (40f—50f) around the curvature of their peripheries, which extends under the inner peripheral edges of the member 30.

To hold the signal buttons and cancelling button depressibly in resilient engagement with the cover member 30, there are secured to the cover member at the underside of inward extensions 30a, spring supporting brackets 36 stamped from sheet metal into the form illustrated in Fig. 4. Screw bolts or other means may secure the central portions of the supporting brackets 36 to the extensions 30a. From each side of the central portion of the brackets 36, arms 36' extend oppositely upon each of which presses a coiled compression spring (42, 52 in Fig. 2), the other end of which is seated in a circular recess near one end of the signal button. Since there are two such brackets 36 and each has two spring supporting arms there will be four springs which thus afford two spring supports for each signal button at its opposite ends.

For resiliently supporting the cancelling button 32 each of the brackets 36 is provided with a central spring supporting arm 36" extending diametrically of the hub. A spring 38 is supported thereby and its other end seats in a recess provided in the end portion of the cancelling button. In this manner the cancelling button is supported resiliently at each end.

For tiltably supporting the signal buttons 40, 50, there are bent up from the supporting brackets 36 from opposite sides of the arms 36" a pair of parallel lugs 36a provided with shoulders 36s on their ends upon which a flange on the inner straight edge of the signal buttons may seat, adjacent each end of the buttons. Thus, each button is supported at each end but can be tilted inwardly of the housing against the pressure of the supporting springs 42, 52.

In order to support the cover portion of the hub removably from the mounting plate 27, four spring fingers 29, symmetrically placed, extend downwardly from the inside peripheral edge of the ring 30. The fingers have V-bent end portions to engage with peripheral notches 27n formed in the periphery of the mounting plate 27.

Parallel to and spaced from the mounting plate 27 is a plate 60. To support this plate 60, legs 61 are bent downwardly therefrom at right angles and have reduced end portions entering recesses in the mounting plate 27 and peened over to permanently secure the plates in spaced parallel relation. Upon the top and bottom surfaces of the plate 60, to afford means for insulatingly mounting certain of the electrical parts, are insulating plates 62 and 63.

Upon the insulating plates 62 and 63 and insulated from the plate 60 are four stationary contacts 64L, 64R, 66R, 66L. Adapted to engage these contacts are movable switching contact members 70 and 80 which are preferably stamped from thin sheet metal in the form illustrated in Fig. 7 with an elongated aperture in the center of each. The switch members 70 and 80 are identical in form, mounting and operation. Hence description of one will be sufficient for the other.

For mounting the member 80 tiltably, a pair of parallel spaced mounting posts 82 are mounted upon and extend upwardly from the plate 60. At their top portions circumferential bearing grooves are formed to receive notched shoulders 83 formed on each side of the movable switch member 80. The grooves in the post 82 are approximately the same thickness as the thickness of the movable switch members 80 so as to retain the shoulders therein. In order to hold the notches in the peripheral grooves in the mounting posts 82, a tension spring 86 is provided having one end anchored in the outer end of the movable switch member adjacent one end of the aperture in that member. The other end of the spring is anchored to a spring anchor post 88 extending upwardly from the plate 60 into the other end of the aperture in the movable switch member. The switch member 80 has a contact button 85 pressed out of its outer end for engagement with the fixed contact 64R when the switch member 80 is moved into the position illustrated in Figs. 6 and 7. At its other end another switch button 87 is pressed out so as to engage the stationary contact 66L when the switch member 80 is in the position of Fig. 12. The spring 86 has an overcenter action by reason of the attachment of its fixed end to the anchor posts 88 at the same level as the point of engagement of the shoulders 83 with the switch member supporting posts 82.

Upon pressing down the right signal button 50, it will engage the outer end of the switch member 80 and move the line of action of the spring 86 through the pivotal plane of the switch member 80 and thus snap the switch member into the position of Fig. 7 and hold it there.

A similar action takes place when the left signal button 40 is pressed down causing the outer end of the switch member 70 to move downwardly and carry the line of action of its overcenter spring through the dead center position. Thereafter the movable switch member 70 has its outer end snapped into and held in lowered position. In that position the switch member 70 has its outer contact button 75 engaged with the fixed contact 64L. The other end of the switch contact 70 has its contact engageable with the fixed contact 66R as illustrated in Fig. 12.

In order to prevent both switch members 70 and 80 from having their outer ends depressed simultaneously, a pivoted rocker member is provided having arms 92 and 94 extending in opposite directions from a central pivotal mounting 96. The ends of the arms 92 and 94 are bent at right angles to engage with the inner ends of the switch members 70 and 80 and the pivot 96 is so located that when the inner end of the switch member 80, for example, engages the arm 94 the rocker member will pivot to cause the arm 92 to engage the inner end of the switch member 70 as is illustrated in Fig. 6. The pivot 96 may be located in an arm 90' bent up at right angles to the body of a bracket member 90, which is secured upon the upper surface of plate 60.

Opposite interlocking action to that described occurs when the switch member 70 is depressed causing its inner end to move upwardly. Thus, the operation of one of the signal control buttons 40 or 50 and consequent movement of the switch member 70 or 80 respectively will cause downward movement of the outer end of its switch member. For example, if button 50 is held down so that the switch member 80 cannot move, the engagement of the inner end of the switch member 70 with the lowered arm 92 will prevent member 70 from being moved by button 40. On release of button 50 and pressing down of button 40, switch member 70 will be moved from the position shown in the drawings and will cause pivoting of the rocker member, which in turn will cause its end 94 to press down the inner end of switch member 80 and snap it into the position of Figs. 5 and 12.

To provide for automatic cancellation of a signal as the steering wheel is turned 180° or more, a weight W of curved, or other suitable form, is pivotally suspended from a pivot rod 91 which extends parallel to the mounting plate between a pair of spaced parallel arms 97. These arms may conveniently be up at right angles from opposite ends of the bracket body 90'. A bearing bracket preferably stamped from sheet metal into U-shape with plane parallel arms 93, 95 has its transverse portion bolted or otherwise secured to the top face of the weight. The pivot rod 91 extends through said arms 93, 95. The weight is thus supported so that in normal straight-ahead driving position (Fig. 8) of the steering wheel the gravitational pull holds the weight against the face of plate 27. However, on 180° rotation of the steering wheel the weight swings out, as illustrated in Fig. 9, wherein a nose 93n or 95n, extending laterally from the arms 93 and 95 respectively, engages the inner end of the switching members 70, 80, whichever happens to have its inner end elevated, i. e. whichever has been operated to give a signal. The force exercised by the weight is enough to overcome the over-center spring (86) and move the switching member to cancel the signal given.

A stop 97s may be provided on one of the arms 97 to limit the pivotal movement of weight W when arm 93 engages said stop.

In order to indicate to the driver that a given signal is registered, windows 100, 101 are provided in the buttons 40 and 50 respectively. Beneath these windows are tell-tale electric lamps 103, 104 mounted in bayonet-type or other suitable socket apertures 105, 106 in a socket plate 107. The socket plate lies against an insulating plate 108 which in turn lies against the bottom surface of the mounting plate 27 and all are riveted together. The socket plate is electrically grounded. The center contacts are on spring metal bars 109, 110 mounted on the insulating plate 108 in insulated relation and are connected by crossed but unconnected bus bars 111, 112 to stationary switch contacts 66L and 66R respectively. Thus, when the movable switch contacts are unoperated as in Fig. 5, they are connected with the center lamp contacts; but they are not illuminated because the circuit is open elsewhere.

The operation of the device is as follows. On deciding to make a right or left turn as he approaches an intersection, the driver will press the right or left signal button 40 or 50. Upon pressing the right signal button 50 for example, it pivots about its support 36a upon the mounting bracket 36 and presses upon the outer end of the right movable switch member 80. This member is thus caused to pivot about its support upon the mounting posts 82. The downward movement of the outer end of the right movable switch member 80 will carry the line of action of the spring 86 across dead center causing the switch member to snap into the position illustrated in Figs. 6 and 7, from the position illustrated in Figs. 5 and 12. This will complete the circuit as described below to light the right signal lights at the front and rear.

As the vehicle comes to the intersection and the steering wheel is rotated clockwise 180°, it carries all of the parts about the axis of the steering column or steering shaft from the position of Fig. 8 to the position of Fig. 9. The change of position of the weight, by gravitational pull, causes the weight to pivot about its pivot into the position of Fig. 9 wherein its nose engages the inner end of the right movable switch member 80 and causes that member to pivot about its supporting posts. Such movement causes the line of action of the spring to move back through dead-center position again whereupon the right movable switch member is snapped into its original position as illustrated in Figs. 5 and 12. This not only breaks the circuit to the right signal lights but also sets up the circuit for lighting the tell-tale lamp 103 when a left signal is to be given.

When a left turn is to be made, the same operation takes place except that the left movable switch member is moved by the depression of the left signal button.

The circuits established by the movement of the switch members may be observed in Fig. 7. In that figure the parts have been moved for making a right turn.

The battery B is connected to one terminal of each of the left and right signal control relays LS and RS. The other terminals of each of these solenoids are connected respectively to the left relay control contact 64L and the right relay control contact 64R, both of which are fixed. These contacts are insulated from each other and from any ground connection as stated above. The left and right movable switch members 70, 80 are connected to ground by their mountings upon the supporting posts 82 which are in turn mounted upon plate 60 which is grounded.

The right front and right rear signal lights RF, RR have one terminal each connected to ground and the other terminal connected together and to one contact of the control relay RS. The other contact of the control relay is connected to the left relay contact and to one terminal F² of the flasher F. Another terminal F' of the flasher is connected to the battery. Equivalent connections are made from the left front and rear signal lamps to ground and to the LS relay contacts. Thus when one or another of the control relays are energised, their movable contacts will bridge their fixed contacts causing current to flow from the battery through the flasher terminal F' and F² through the control relay contacts to the front and rear signal lights.

After the driver has released the signal button it will be restored by the spring in back of it to its original position. In order to remind the driver what signal is being given, the tell-tale light is caused to be lighted by completion of the circuit as follows. For a right turn, as indicated in Fig. 7, the current will flow from the battery through the flasher terminal F' and from terminal F³ to the socket plate 108 of the telltale lamps, through the tell-tale lamp 104 and from the center contact thereof to the bus bar connections 110, 112 to the auxiliary fixed contact 66R of the left signal control switch. That contact will be engaged by the left movable switch member 78 and the current will flow through it to the mounting posts 82 and to ground.

If, after either a right or a left signal is given it is desired to cancel the signal, the operator can do so by depressing the center or cancelling button 32. That will cause it to engage the pivoted rocker member which in turn will engage the inner end of whichever movable switch member has been actuated and is elevated, as may be observed in Fig. 6. In that way the switch member will be restored to the position illustrated in Figs. 5 and 12. Upon release of the cancelling button it will be restored by the urge of the spring to its original position as illustrated in Figs. 2 and 6.

From the foregoing, it will be observed that I have provided a device which may be mounted entirely within the hub of a steering wheel without the need of any extending levers or manually movable elements and which upon rotation of the steering wheel is caused automatically to cancel a signal previously given due to the gravitational effect of the weight. But the cancelling weight is normally not effective because movement of the steering wheel on the straight-away is less than the angle needed to move the weight.

Moreover, at any time after a signal has been registered it may be cancelled manually by the manual control button which is also entirely located within the steering wheel hub.

In the foregoing reference to rotation of the steering wheel 180° or more is intended to indicate that by rotation of 180° cancellation is ensured. It will be understood however that the particular point at which the weight pivots to cause cancellation may be determined by the location of the pivot point with relation to the center of gravity of the weight and the angle of tilt of the particular steering wheel.

Many modifications within the scope of my invention will occur to those skilled in the art. Therefore I do not limit the invention to the examples shown.

What I claim is:

1. In a turn signal switch in combination with a vehicle steering wheel comprising a housing formed as part of the steering wheel hub and rotatable with the steering wheel, an electric switch mounted interiorly of said housing and selectively actuatable from a neutral "off" position to right and left hand "on" positions, right and left hand depressible members constituting a part of said housing and resiliently mounted for relative movement therein and operable when depressed to actuate said switch to its right and left hand "on" positions respectively, a third depressible member constituting a part of said housing and resiliently mounted for relative movement therein operable when depressed to actuate said switch to its neutral "off" position, and weighted means pivotally mounted in said housing for free swinging movement therein in cooperative association with said switch and operable upon predetermined rotation of the steering wheel to engage said switch and actuate the switch to its neutral "off" position.

2. In a turn signal switch in combination with a vehicle steering wheel comprising a housing formed as part of the steering wheel hub and rotatable with the steering wheel, an electric switch mounted interiorly on said housing and selectively actuatable from a neutral "off" position to right and left hand "on" positions, a cover for said housing, right and left hand depressible members mounted in said cover for relative movement therein and operable when depressed to actuate said switch to its right and left hand "on" positions respectively, and a third depressible member mounted in said cover centrally of said right and left hand depressible members operable upon being depressed to actuate said switch to its neutral "off" position.

3. In a turn signal switch in combination with a vehicle steering wheel comprising a housing formed as part of the steering wheel hub and rotatable with the steering wheel, an electric switch mounted interiorly on said housing and selectively actuatable from a neutral "off" position to right and left hand "on" positions, a cover for said housing, right and left hand depressible members mounted in said cover for relative movement therein and operable when depressed to actuate said switch to its right and left hand "on" positions respectively, a third depressible member mounted in said cover centrally of said right and left hand depressible members operable when depressed to actuate said switch to its neutral "off" position, and means in said cover resiliently biasing said depressible members upwardly with respect to the cover.

4. In a turn signal switch in combination with a vehicle steering wheel comprising a housing formed as part of the steering wheel hub and rotatable with the steering wheel, an electric switch mounted interiorly of said housing including a pair of movable switch elements, said switch selectively actuatable from a neutral "off" position to right and left hand "on" positions respectively, manual actuator means resiliently mounted in said housing in cooperative association with each of said switch elements and operable when actuated to engage the associated switch element and actuate the switch from the neutral "off" position to an "on" position, and another manual actuator resiliently mounted in said housing operable to actuate both said switch elements and return the switch to its neutral "off" position.

5. In a turn signal switch in combination with a vehicle steering wheel comprising a housing formed as part of the steering wheel hub and rotatable with the steering wheel, an electric switch mounted interiorly of said housing including a pair of movable switch elements, said switch selectively actuatable from a neutral "off" position to right and left hand "on" positions respectively, manual actuator means resiliently mounted in said housing in cooperative association with each of said switch elements and operable when actuated to engage the associated switch element and actuate the switch from the neutral "off" position to an "on" position, a rocker member common to both said switch elements, and another manual actuator resiliently mounted in said housing operable when actuated to cause the rocker to engage said switch elements and actuate the switch to its neutral "off" position.

6. In a turn signal switch in combination with a vehicle steering wheel comprising a housing formed as part of the steering wheel hub and rotatable with the steering wheel, an electric switch mounted interiorly of said housing including a pair of movable switch elements, said switch selectively actuatable from a neutral "off" position to right and left hand "on" positions respectively, manual actuator means resiliently mounted in said housing in cooperative association with each of said switch elements and operable when actuated to engage the associated switch element and actuate the switch from the neutral "off" position to an "on" position, another manual actuator resiliently mounted in said housing operable to actuate both said switch elements and return the switch to its neutral "off" position, and a weighted member pivotally mounted in said housing for movement between predetermined limit positions operable upon rotation of the steering wheel to move from one limit position to the other limit position, and means on said weighted member operable upon movement of the weighted member to said other limit position to engage both of said switch elements and actuate said switch to its neutral "off" position.

7. In a turn signal switch in combination with a vehicle steering wheel comprising a housing formed as part of the steering wheel hub and rotatable with the steering wheel, an electric switch mounted interiorly of said housing including a pair of movable switch elements, said switch selectively actuatable from a neutral "off" position to right and left hand "on" positions respectively, manual actuator means constituting a part of said housing in cooperative association with each of said switch elements and operable when actuated to engage the associated switch element and actuate the switch from the neutral "off" position to an "on" position, a rocker member common to both said switch elements, another manual actuator constituting a part of said housing cooperable when actuated to cause the rocker to engage said switch elements and actuate the switch to its neutral "off" position, and a weighted member pivotally mounted in said housing for movement between predetermined limit positions operable upon rotation of the steering wheel to move from one limit position to the other limit position, and means on said weighted member operable upon movement of the weighted member to said other limit position to engage both of said switch elements and actuate said switch to its neutral "off" position.

8. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, manual actuator means mounted in said housing in cooperative association with each of said switch elements and operable when actuated to engage and actuate the associated switch element to one limit position thereof, a rocker member common to both said switch elements operable upon actuation of one of said manual actuator means to engage and retain in its other limit position the switch element associated with the other actuator means, and another manual actuator mounted in said housing cooperable with said rocker and operable when actuated to cause the rocker to actuate to its other limit position a switch element previously actuated to said one limit position.

9. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, an over-center spring acting on each of said switch elements and operable to resiliently maintain said switch elements in either of said limit positions, manual actuator means resiliently mounted in said housing in cooperative association with each of said switch elements and operable when actuated to engage and actuate the associated switch element to one limit position thereof, a rocker member common to both said switch elements operable upon actuation of one of said manual actuator means to engage and retain in its other limit position the switch element associated with the other actuator means, and another manual actuator resiliently mounted in said housing cooperable with said rocker and operable when actuated to cause the rocker to actuate to its other limit position a switch element previously actuated to said one limit position.

10. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, an over-center spring acting on each of said switch elements and operable to resiliently maintain said switch elements in either of said limit positions, a pair of manual actuator means constituting a part of said housing in cooperative association with each of said switch elements and operable when actuated to engage and actuate the associated switch element to one limit position thereof, a rocker member common to both said switch elements operable upon actuation of one of said manual actuator means to engage and retain in its other limit position the switch element associated with the other actuator means, and another manual actuator mounted centrally of said pair of actuators constituting a part of said housing cooperable with said rocker and operable when actuated to cause the rocker to actuate to its other limit position a switch element previously actuated to said one limit position.

11. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, manual actuator means resiliently mounted in said housing in cooperative association with each of said switch elements and operable when actuated to engage and actuate the associated switch element to one limit position thereof, and a rocker member common to both said switch elements operable upon actuation of one of said manual actuator means to engage and retain in its other limit position the switch element associated with the other actuator means, said rocker mechanically operable to actuate to its other limit position a switch element previously actuated to said one limit position.

12. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, manual actuator means resiliently mounted in said housing in cooperative association with each of said switch elements and operable when actuated to engage and actuate the associated switch element to one limit position thereof, a rocker member common to both said switch elements operable upon actuation of one of said manual actuator means to engage and retain in its other limit position the switch element associated with the other actuator means, another manual actuator resiliently mounted in said housing cooperable with said rocker and operable when actuated to cause the rocker to actuate to its other limit position a switch element previously actuated to said one limit position, a weighted member pivotally mounted in said housing for movement between predetermined limit positions and actuatable upon a predetermined rotation of the steering wheel to move from one limit position to its other limit position, and means on said weighted member operable upon movement of the weighted member to said other limit position to engage both of said switch elements and force the switch elements to the said other limit positions thereof.

13. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, a pair of manual actuator means resiliently mounted in said housing in cooperative association with each of said switch elements and operable when actuated to engage and actuate the associated switch element to one limit position thereof, a rocker member common to both said switch elements operable upon actuation of one of said manual actuator means to engage and retain in its other limit position the switch element associated with the other actuator means, a weighted member pivotally mounted in said housing for movement between predetermined limit positions and actuatable upon a predetermined rotation of the steering wheel to move from one limit position to its other limit position, and means on said weighted member operable upon movement of the weighted member to said other limit position to engage both of said switch elements and force the switch elements to the said other limit positions thereof.

14. In a turn signal switch in combination with a vehicle steering wheel comprising a housing formed as part of the steering wheel hub and rotatable with the steering wheel, an electric switch mounted interiorly of said housing comprising a pair of switch elements each pivotally mounted at their midpoints for independent pivotal movement between two limit positions, an over-center spring acting on each of said switch elements and operable to resiliently maintain said switch elements in either of said limit positions, a pair of manual actuator means constituting a part of said housing in cooperative association with each of said switch elements and operable when actuated to engage and actuate the associated switch element to one limit position thereof, a rocker member common to both said switch elements operable upon actuation of one of said manual actuator means to engage and retain in its other limit position the switch element associated with the other actuator means, another manual actuator centrally of said pair of actuators constituting a part of said housing cooperable with said rocker and operable when actuated to cause the rocker to actuate to its other limit position a switch element previously actuated to said one limit position, a weighted member pivotally mounted for free swinging movement in said housing between predetermined limit positions and acutatable upon a predetermined rotation of the steering wheel to move from one limit position to its other limit position, and means on said weighted member operable upon movement of the weighted member to said other limit position to engage both of said switch elements and force the switch elements to the said other limit positions thereof.

ROBERT W. BUTLER.

References Cited in the file of this patent
UNITED STATES PATENTS

| Number | Name | Date |
|---|---|---|
| 1,802,647 | Haynsworth | Apr. 28, 1931 |
| 1,854,056 | Mott, Jr. | Apr. 12, 1932 |
| 2,040,923 | Doane | May 19, 1936 |
| 2,064,735 | Curtiss | Dec. 15, 1936 |
| 2,108,454 | Steinman | Feb. 15, 1938 |
| 2,182,029 | Markham | Dec. 5, 1939 |
| 2,182,764 | Polk | Dec. 5, 1939 |
| 2,347,937 | Cross | May 2, 1944 |
| 2,432,388 | Curtiss | Dec. 9, 1947 |
| 2,535,384 | Batt | Dec. 26, 1950 |